(12) United States Patent
Koo

(10) Patent No.: US 6,745,792 B2
(45) Date of Patent: Jun. 8, 2004

(54) HYDRAULIC RELIEF VALVE

(75) Inventor: Bon Seok Koo, Kyungsangnam-do (KR)

(73) Assignee: Volvo Construction Equipment Holding Sweden AB (SE)

( * ) Notice: Subject to any disclaimer, the term of this patent is extended or adjusted under 35 U.S.C. 154(b) by 0 days.

(21) Appl. No.: 10/212,379

(22) Filed: Aug. 5, 2002

(65) Prior Publication Data
US 2003/0111114 A1 Jun. 19, 2003

(30) Foreign Application Priority Data
Dec. 18, 2001 (KR) .................................. 2001-80587

(51) Int. Cl.[7] ............................................. G05D 16/16
(52) U.S. Cl. ..................................... 137/491; 137/614.2
(58) Field of Search .............................. 137/491, 512, 137/513.3, 513.5, 614.2

(56) References Cited
U.S. PATENT DOCUMENTS 3,771,554 A * 11/1973 Hassall ...................... 137/491
3,952,771 A * 4/1976 Lang .......................... 137/491
4,351,356 A * 9/1982 Koiwai et al. ............... 137/491
4,476,890 A * 10/1984 Kawasaki et al. ........... 137/269
4,548,231 A * 10/1985 Schwede ..................... 137/491
4,896,694 A * 1/1990 Rausch ........................ 137/491
5,195,556 A * 3/1993 Fassbender .................. 137/491

* cited by examiner

Primary Examiner—Ramesh Krishnamurthy
(74) Attorney, Agent, or Firm—Harness, Dickey & Pierce, P.L.C.

(57) ABSTRACT

In a hydraulic relief valve having a main poppet draining into a pressure-oil tank hydraulic fluid flowing into a sleeve from a hydraulic pump and a pilot poppet draining into the oil tank the hydraulic fluid upon the occurrence of a high pressure over a pressure value set in a back-pressure chamber of the sleeve, an annular interference-preventing projection is provided to be formed in an outer periphery of the sleeve to be placed at boundary portions of feedback paths of feedback fluid on the side of the main poppet which is drained past a throttle of the sleeve and feedback fluid on the side of the pilot poppet which is drained past a feedback fluid path formed outside the sleeve.

5 Claims, 3 Drawing Sheets

HYDRAULIC RELIEF VALVE

BACKGROUND OF THE INVENTION

1. Field of the Invention

The present invention relates to a hydraulic relief valve capable of preventing mutual interferences due to the direct collisions of feedback fluid when draining a high-pressure hydraulic fluid into a pressure-oil tank in order to protect a hydraulic circuit in case that the hydraulic fluid discharged from a hydraulic pump mounted in construction equipment and the like reaches a pressure value set in the hydraulic circuit.

2. Description of Prior Art

In general, the heavy construction equipment such as an excavator drives an actuator such as a hydraulic cylinder mounted to the excavator by means of a hydraulic fluid discharged from a hydraulic pump for work, the hydraulic fluid from the hydraulic pump is supplied to various actuators via a control valve controlling flow directions thereof, so that, in case that a high pressure excessive of a working pressure set in the hydraulic circuit occurs, a relief valve is mounted in the control valve to constantly maintain the working pressure by draining the working fluid into the pressure-oil tank.

Accordingly, if the performance of the relief valve is deteriorated, the working performance of a corresponding actuator is deteriorated as well as high-frequency coupling and chattering phenomena occur during the drain of the high-pressure fluid, to thereby make worse the workability and reliability on the equipment due to noisy sounds tormenting drivers.

FIG. 1 is a cross-sectioned view of a conventional hydraulic relief value.

As shown in FIG. 1, the hydraulic relief valve comprises a sleeve 5, a main poppet 1 controlling a feedback fluid v on the side of the main poppet which is drained into a pressure-oil tank T by opening and closing a throttle d of the sleeve 5, and a feedback fluid path c on the side of a pilot poppet which drains a high-pressure working fluid in case that a high pressure over a set value in a back-pressure chamber b formed in the sleeve 5 occurs.

Further, comprised is a valve seat 7 centered with a through-hole 7a and supported at the outlet of the sleeve 5, and a pilot poppet 2 supported to open and close the through-hole 7a of the valve seat 7 and for opening the through-hole 7a when a high pressure over a set value in the back-pressure chamber b occurs and draining into the pressure-oil tank T a feedback fluid w on the side of the pilot poppet via the feedback fluid path c.

A reference numeral 3 not described in the drawing denotes an elastic member pressure-supporting the pilot poppet 2 and elastically biasing the closed through-hole 7a in an initial state, and 8 an elastic member pressure-supporting the main poppet 1 and elastically biasing the closed throttle d in an initial state.

Accordingly, a working fluid discharged from a hydraulic pump P have the same pressure as an internal pressure of the back-pressure chamber b past the throttle a of the main poppet 1, and the main poppet 1 maintains the closed throttle d of the sleeve 5 in an initial state by a pressure difference at both ends thereof due to a difference of diameters D1 and D2(D1<D2) thereof, so the feedback fluid v on the main poppet side is not drained into the oil tank T.

If the pressure of the working fluid flowing into the back-pressure chamber b discharged from the hydraulic pump P becomes excessive of the elastic coefficient of the elastic member 3 pressure-supporting the pilot poppet 2, and the pilot poppet 2 overcomes an elastic force of the elastic member 3 and is shifted to the right direction of the drawing, so the high-pressure hydraulic fluid in the back-pressure chamber b passes the throttle e of the valve seat 7 and the feedback fluid path c on the pilot poppet side in order and drains into the oil tank T and the working pressure in the back-pressure chamber b becomes less than that of the hydraulic fluid discharged from the hydraulic pump P.

As such, upon shifting the main poppet 1 to the right direction of the drawing, the feedback fluid v on the main poppet side, which is discharged from the hydraulic pump P, is drained to the oil tank T through the throttle d of the sleeve 5 and a drain hole 5d of the sleeve 5 which are opened, so the pressure of hydraulic fluid discharged from the hydraulic pump P does not increase any further.

In the meantime, upon shifting the pilot poppet 2 to the left direction of the drawing by a restoration force of the elastic member 3 pressure-supporting the pilot poppet 2 with a fallen pressure inside the back-pressure chamber b, the through-hole 7a of the valve seat 7 is closed and the pressure inside the back-pressure chamber c increases again, so the main poppet 1 shifts to the left direction of the drawing due to a pressure difference of both ends caused by a difference of the diameters D1 and D2 thereof and then the pressure set in the hydraulic circuit can be maintained.

However, if the hydraulic fluid discharged from the hydraulic pump P reaches a set pressure value, for the hydraulic fluid of the back-pressure fluid chamber b, the feedback fluid w on the pilot poppet side which is drained into the hydraulic tank T through the throttle e and the feedback fluid path c on the pilot poppet side, and the feedback fluid v on the main poppet which is discharged from the hydraulic pump P and drained into the hydraulic tank T through the throttle d of the sleeve 5 and a drain hole 5d are collided to each other and collected into the hydraulic tank T, so a noise problem producing fluid-current sounds in the collisions occurs as well as another problem rises in which the inherent working performance of the hydraulic relief valve is deteriorated due to hydraulic mutual interferences.

SUMMARY OF THE INVENTION

It is an object of the present invention to provide a hydraulic relief valve capable of preventing a feedback fluid on a pilot poppet side and a feedback fluid on a main poppet side from collisions when drained into a hydraulic tank by relief valve operations to minimize the occurrence of fluid-current sounds and of securing a smooth operation performance of the relief valve due to hydraulic interferences.

In order to achieve the above object, in a hydraulic relief valve having a sleeve, a main poppet shiftably coupled inside the sleeve and for opening and closing a throttle of the sleeve, a feedback fluid paths formed inside the sleeve for draining hydraulic fluid into a pressure-oil tank upon occurrence of a high pressure over a pressure value set in a back-pressure chamber formed inside the sleeve, a valve seat supported at an outlet of the sleeve and having through-holes, and a pilot poppet supported to open and close the through-holes and for draining the hydraulic fluid into the oil tank through the feedback fluid paths upon the occurrence of the high pressure of the back-pressure chamber, a preferred embodiment of the present invention provides an annular interference-preventing projection formed on an outer periphery of the sleeve and placed at boundary portions of the feedback paths of the feedback fluid on the main poppet side through the throttle of the sleeve and the feedback fluid on the pilot poppet side which passes a feedback fluid path formed inside the sleeve, to thereby prevent the feedback fluid on the main poppet side and the feedback fluid on the pilot poppet side from direct collisions when the feedback fluids are respectively drained into the oil tank.

Preferably, according to a preferred embodiment of the present invention, the annular interference-preventing projection is formed in one body on the outer periphery of the sleeve.

Further, the annular interference-preventing projection is machined as a part separated from the sleeve and fixedly coupled to the outer periphery of the sleeve.

Yet further, the annular interference-preventing projection is screw-coupled to a screw part formed in the outer periphery of the sleeve.

Furthermore, the annular interference-preventing projection is fixedly welded to the outer periphery of the sleeve.

BRIEF DESCRIPTION OF THE DRAWINGS

Hereinafter, a preferred embodiment of the present invention is described in detail with reference to the accompanying drawings.

DETAILED DESCRIPTION OF THE PREFERRED EMBODIMENT

Hereinafter, a hydraulic relief valve according to an embodiment of the present invention is described in detail with reference to the attached drawings.

Figure 2:
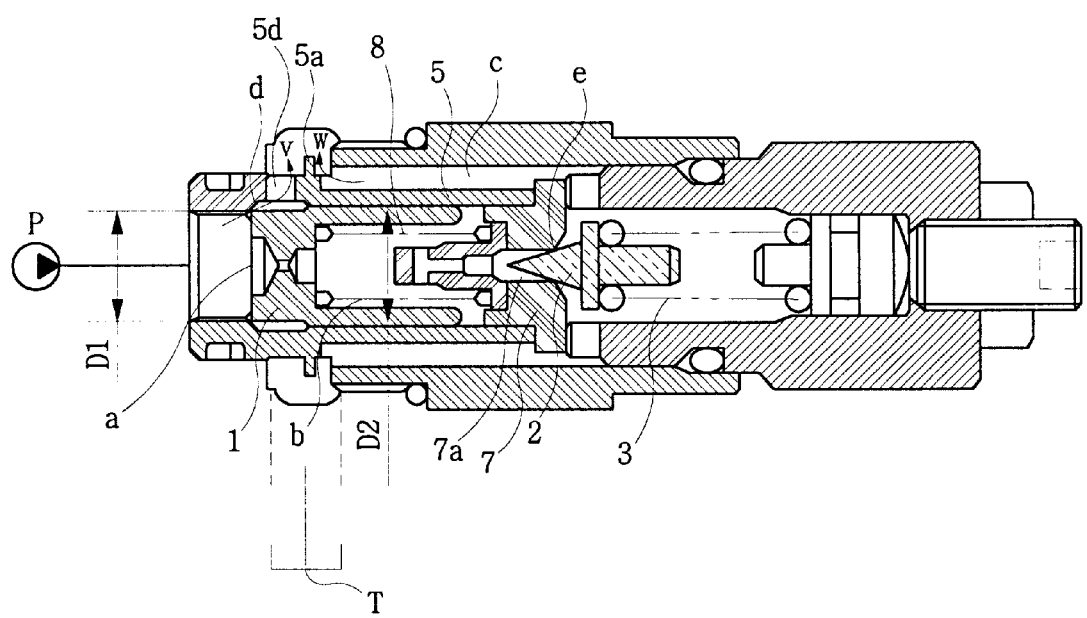
FIG. 2 is a cross-sectioned view for schematically showing a hydraulic relief valve according to an embodiment of the present invention.

FIG. 2 is a cross-sectioned view for showing a hydraulic relief valve according to a preferred embodiment of the present invention.

Figure 1:
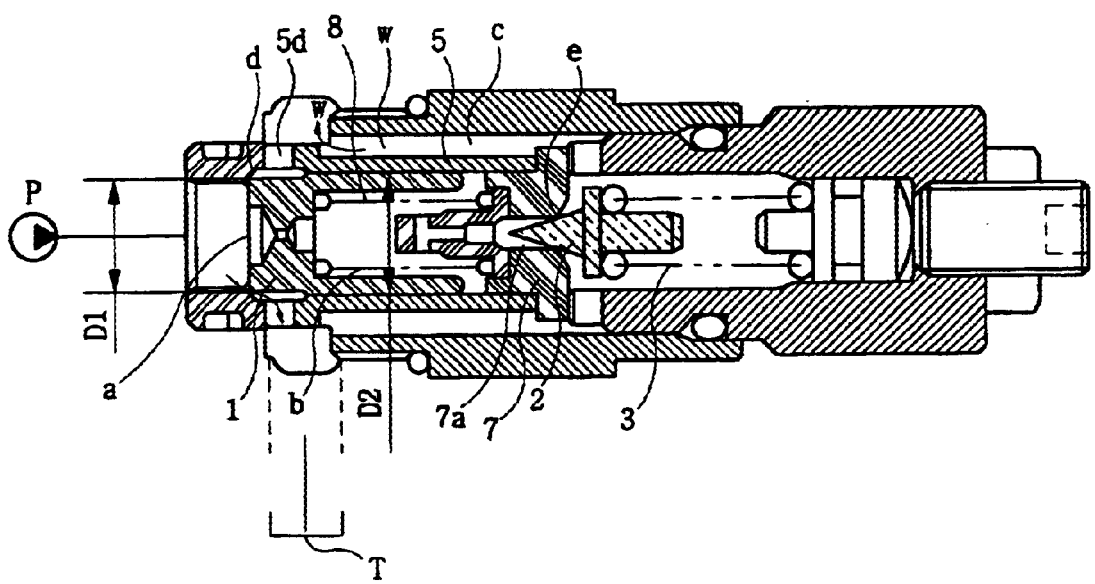
FIG. 1 is a cross-sectioned view for schematically showing a conventional hydraulic relief valve.

As shown in FIG. 2, the hydraulic relief valve according to a preferred embodiment of the present invention has a sleeve 5, a main poppet 1 for opening and closing a throttle d of the sleeve 5, a feedback fluid path c formed inside the sleeve 5 for draining a hydraulic fluid into a pressure-oil tank T upon the occurrence of a high pressure over a pressure value set in a back-pressure chamber b formed inside the sleeve 5, a valve seat 7 supported on an outlet of the sleeve 5 and having a through-hole 7a, and a pilot poppet 2 supported to open and close the through-hole 7a and for draining the hydraulic fluid into the oil tank T through the through-hole 7a and the feedback fluid path c upon the occurrence of a high pressure over a set value in the back-pressure chamber b, all of which are substantially the same as those shown in FIG. 1 so that a detailed description on the structure and operations thereof are omitted and like components will be denoted in like reference numerals.

The hydraulic relief valve according to a preferred embodiment of the present invention has an annular interference-preventing projection 5a formed on the outer periphery of the sleeve 5 and placed at boundary portions of feedback paths of feedback fluid on the main poppet side which flows in the sleeve 5 and is drained into the pressure-oil tank T through the throttle d and a drain hole 5d of the sleeve 5, and a feedback fluid w on the pilot poppet side which is drained into the oil tank T through the feedback fluid path c formed inside the sleeve 5 from the back-pressure chamber b.

Hereinafter, the operations of the hydraulic relief valve according to a preferred embodiment of the present invention is described in more detail with reference to the attached drawings.

As shown in FIG. 2, hydraulic fluid discharged from the hydraulic pump P flows in the back-pressure chamber b through a throttle a of the main poppet 1, and, if the pressure of the hydraulic fluid in the back-pressure chamber b exceeds an elastic coefficient of an elastic member 3 pressure-supporting the pilot poppet 2, the pilot poppet 2 is shifted to the right direction of the drawing and the high-pressure hydraulic fluid in the back-pressure chamber b is drained into the oil tank T through the throttle e of the valve seat 7 and the feedback fluid path c on the pilot poppet side which is formed inside the sleeve, so the pressure in the back-pressure chamber b falls below the pressure of the hydraulic fluid discharged from the hydraulic pump P.

Accordingly, when the main poppet 1 is shifted to the right direction of the drawing of FIG. 2, the feedback fluid v on the main poppet side which is discharged from the hydraulic pump P is drained into the oil tank T through the throttle d and drain hole 5d of the sleeve 5, so the pressure of the hydraulic fluid discharged from the hydraulic pump P and flowing in the back-pressure chamber b does not increase any further but shifts pilot poppet 2 to the left direction of the drawing by a restoration force of the elastic member 3 elastically supporting the pilot poppet 2 with the fallen pressure in the back-pressure chamber b.

Accordingly, the through-hole 7a of the valve seat 7 is closed, so the pressure inside the back-pressure chamber c increases again and the main poppet 1 is shifted to the left direction of the drawing due to a pressure difference of both ends which is caused by a difference of diameters D1 and D2(D1<D2), enabling a pressure in the hydraulic circuit to be maintained in a set value.

In the meantime, if the pressure of the hydraulic fluid flowing in the back-pressure chamber b from the hydraulic pump P reaches the set value, the main poppet 1 is shifted to the right direction of the drawing of FIG. 2 along the inner periphery of the sleeve 5, so the feedback fluid v on the main poppet side which flows in the sleeve 5 from the hydraulic pump P and passes the throttle d and drain hole 5d of the sleeve 5 and the feedback fluid w on the pilot poppet side which is discharged from the back-pressure chamber b and passes the throttle e of the valve seat 7 and the feedback fluid path c on the pilot poppet side are respectively drained to the oil tank T.

At this time, the feedback fluid v on the main poppet side and the feedback fluid w on the pilot poppet side are prevented from direct collisions by the annular interference-preventing projection 5a formed around the outer periphery of the sleeve 5 and placed at the boundary portions of the feedback paths, to thereby minimize the occurrence of fluid-current sounds and prevent the working performance of the relief valve from being deteriorated by hydraulic mutual interferences.

In the meantime, a hydraulic relief valve according to another preferred embodiment of the present invention will be described in detail with reference to the attached drawings.

Figure 3:
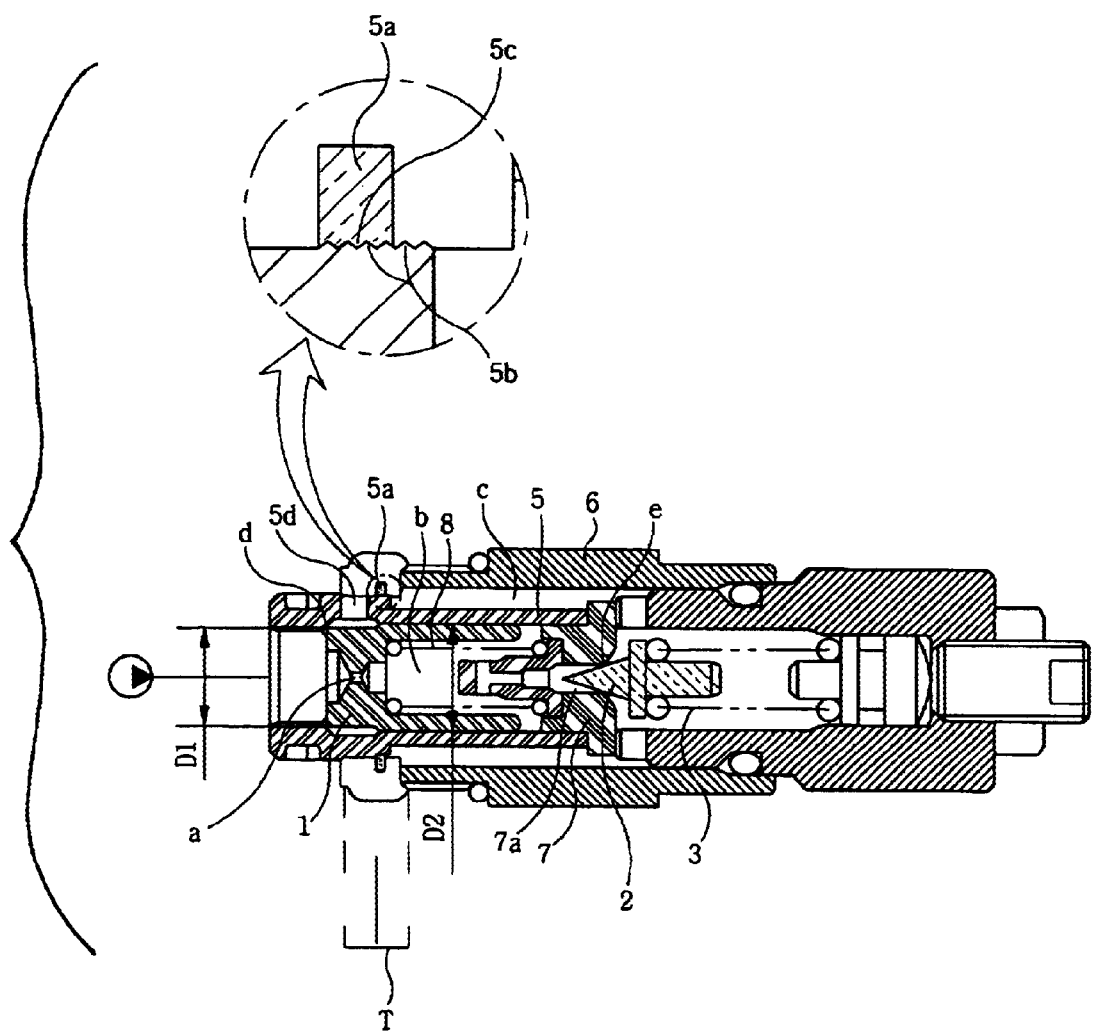
FIG. 3 is a cross-sectioned view for schematically showing a hydraulic relief valve according to another embodiment of the present invention.

As shown in FIG. 3, the hydraulic relief valve according to another embodiment of the present invention includes the sleeve 5, and the main poppet 1 elastically mounted to open and close the throttle d of the sleeve 5, the valve seat 7 supported at the outlet of the sleeve 5, and the pilot poppet 2 elastically mounted to open and close the throttle e of the valve seat 7, all of which are substantially the same as those shown in FIG. 2 so a description thereof will be omitted, and the annular interference-preventing projection 5a is machined as a part separated from the sleeve 5 and then can be fixedly coupled outside the sleeve 5.

For example, a screw part 5b is formed on the outer periphery of the sleeve 5 and a screw hole 5c corresponding to the screw part 5b is formed in the annular interference-preventing projection 5a, so the annular interference-preventing projection 5a can be screw-coupled to the sleeve 5 or fixedly welded after coupled to the outer periphery of the sleeve 5.

The hydraulic relief valve according to another embodiment of the present invention has the annular interference-preventing hole projection 5a fixed coupled to the sleeve 5 after the annular interference-preventing hole projection 5a is machined as a part separated from the sleeve 5, so the manufacture cost machining and assembling the sleeve 5 can be greatly reduced.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

The entire disclosure of Korean Application No. 2001-80587, filed Dec. 18, 2001 is hereby incorporated by reference.

What is claimed is:

1. In a hydraulic relief valve having a sleeve, a main poppet shiftably coupled inside the sleeve and for opening and closing a throttle of the sleeve, a feedback fluid paths formed inside the sleeve for draining hydraulic fluid into a pressure-oil tank upon occurrence of a high pressure over a pressure value set in a back-pressure chamber formed inside the sleeve, a valve seat supported at an outlet of the sleeve and having through-holes, and a pilot poppet supported to open and close the through-holes and for draining the hydraulic fluid into the oil tank through the feedback fluid paths upon the occurrence of the high pressure of the back-pressure chamber, the hydraulic relief valve comprising:

an annular interference-preventing projection formed on an outer periphery of the sleeve and placed at boundary portions of the feedback paths of the feedback fluid on the main poppet side through the throttle of the sleeve and the feedback fluid on the pilot poppet side which passes a feedback fluid path formed inside the sleeve, to thereby prevent the feedback fluid on the main poppet side and the feedback fluid on the pilot poppet side from direct collisions when the feedback fluids are respectively drained into the oil tank.

2. The hydraulic relief valve as claimed in claim 1, wherein the annular interference-preventing projection is formed in one body on the outer periphery of the sleeve.

3. The hydraulic relief valve as claimed in claim 1, wherein the annular interference-preventing projection is machined as a part separated from the sleeve and fixedly coupled to the outer periphery of the sleeve.

4. The hydraulic relief valve as claimed in claim 3, wherein the annular interference-preventing projection is screw-coupled to a screw part formed in the outer periphery of the sleeve.

5. The hydraulic relief valve as claimed in claim 3, wherein the annular interference-preventing projection is fixedly welded to the outer periphery of the sleeve.

* * * * *